United States Patent
Ghosh et al.

(10) Patent No.: US 12,247,839 B2
(45) Date of Patent: Mar. 11, 2025

(54) WAYPOINT ORDERING

(71) Applicant: Ford Global Technologies, LLC, Dearborn, MI (US)

(72) Inventors: Joydip Ghosh, Farmington Hills, MI (US); Rathi Munukur, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 18/145,080

(22) Filed: Dec. 22, 2022

(65) Prior Publication Data

US 2024/0210184 A1   Jun. 27, 2024

(51) Int. Cl.
G01C 21/00   (2006.01)
G01C 21/34   (2006.01)
G01C 21/36   (2006.01)

(52) U.S. Cl.
CPC ..... G01C 21/3461 (2013.01); G01C 21/3469 (2013.01); G01C 21/3492 (2013.01); G01C 21/3605 (2013.01)

(58) Field of Classification Search
CPC ............ G01C 21/3461; G01C 21/3469; G01C 21/3492; G01C 21/3605
USPC ........................................................ 701/533
See application file for complete search history.

(56) References Cited

U.S. PATENT DOCUMENTS

| | | | |
|---|---|---|---|
| 9,448,081 B2 | 9/2016 | Kuznetsov et al. | |
| 10,012,995 B2 | 7/2018 | Kojo et al. | |
| 10,101,164 B2 | 10/2018 | Thakur | |
| 10,648,823 B2 | 5/2020 | Bagchi | |
| 10,663,300 B2 | 5/2020 | Huang et al. | |
| 11,435,744 B2 | 9/2022 | Cooper | |
| 2003/0014286 A1* | 1/2003 | Cappellini | G06Q 10/02 705/5 |
| 2019/0020578 A1* | 1/2019 | Beckmann | H04L 45/42 |
| 2020/0271464 A1* | 8/2020 | Zavesky | G01C 21/3492 |
| 2021/0356279 A1 | 11/2021 | Szigeti | |
| 2023/0059112 A1* | 2/2023 | Ito | G01C 21/3469 |
| 2023/0140162 A1* | 5/2023 | Malson | B60W 60/001 701/26 |
| 2023/0304817 A1* | 9/2023 | Fukuda | G06F 18/24137 |

(Continued)

FOREIGN PATENT DOCUMENTS

| | | |
|---|---|---|
| CN | 105675002 B | 6/2016 |
| CN | 109389825 A | 2/2019 |
| EP | 3916652 A1 | 12/2021 |

*Primary Examiner* — Mahmoud S Ismail
(74) *Attorney, Agent, or Firm* — Christopher Storms; Brooks Kushman P.C.

(57) ABSTRACT

A computer includes a processor and a memory, and the memory stores instructions executable by the processor to divide a plurality of waypoints in a geographic area into a plurality of clusters according to at least one metric, arrange the clusters into an upper-level ordering by executing an optimization algorithm, arrange the waypoints within the respective clusters into a plurality of respective lower-level orderings by executing the optimization algorithm on the respective clusters, and output the waypoints in a final ordering by concatenating the waypoints in the lower-level orderings according to the upper-level ordering. The final ordering defines a final route passing through the waypoints in the final ordering.

21 Claims, 5 Drawing Sheets

(56) References Cited

U.S. PATENT DOCUMENTS

2023/0342708 A1\* 10/2023 Coughran .............. G06Q 10/04
2023/0394385 A1\* 12/2023 Kelleher .......... G06Q 10/06393

\* cited by examiner

WAYPOINT ORDERING

BACKGROUND

Global motion planning may be used for determining a route for a vehicle to follow. Algorithms for global motion planning include incremental-search based planners such as rapidly-exploring random tree (RRT), graph-based planning methods that use road structures, sampling-based methods such as probabilistic roadmap path (PRM) planning, etc.

DETAILED DESCRIPTION

Figure 1:
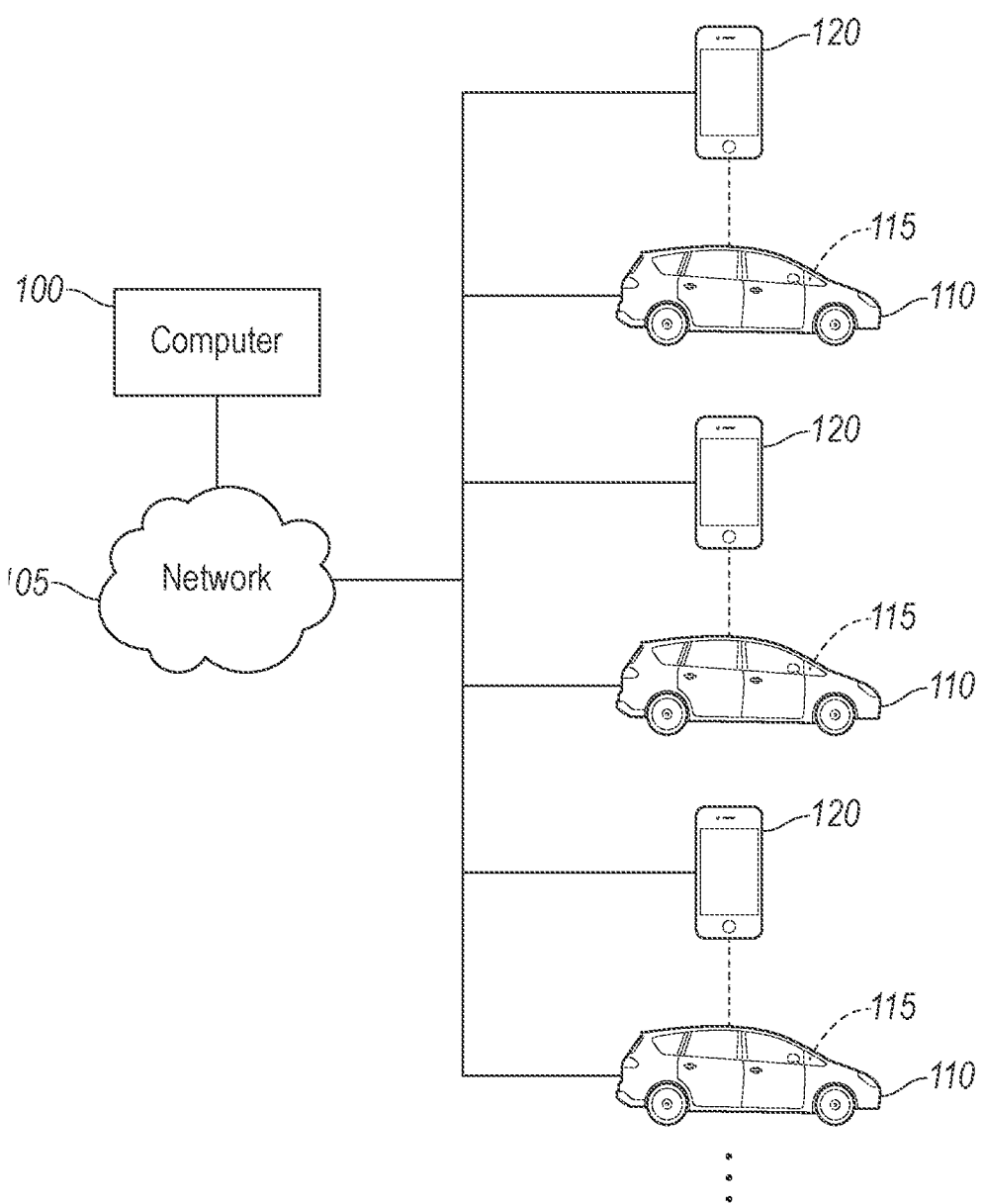
FIG. 1 is a block diagram of a vehicle management system.

This disclosure provides techniques for increasing efficiency of vehicle operation by determining an optimal ordering of a set of waypoints through which the vehicle can travel. A computer divides the waypoints into clusters, arranges the clusters into an upper-level ordering by executing an optimization algorithm, arranges the waypoints within the clusters into respective lower-level orderings by executing the optimization algorithm on the clusters, and outputs the waypoints in a final ordering by concatenating the waypoints in the lower-level orderings according to the upper-level ordering. The final ordering defines a route passing through the waypoints in the final ordering, along which the vehicle can travel. For example, the computer may divide the waypoints into a first cluster, a second cluster, and a third cluster. The computer arranges the clusters into an upper-level ordering of {second cluster, first cluster, third cluster}. The computer determines a first lower-level ordering of the waypoints in the first cluster, a second lower-level ordering of the waypoints in the second cluster, and a third lower-level ordering of the waypoints in the third cluster. The computer outputs the waypoints in a final ordering as follows: the waypoints in the second cluster in the second lower-level ordering, then the waypoints in the first cluster in the first lower-level ordering, and then the waypoints in the third cluster in the third lower-level ordering. The vehicle may then travel to the waypoints in the final ordering.

The use of these techniques may significantly reduce processing time. For example, an experiment based on the present disclosure was conducted to determine an order for a vehicle to travel through waypoints located in the San Francisco Bay Area. In one trial, the waypoints were divided into clusters geographically and an optimization algorithm to minimize energy consumption (e.g., fuel or charge) was applied to the waypoints in each cluster and to the clusters as a group, as described herein (illustrated in FIG. 4). The processing time was approximately 2.5 hours. In a second trial, the same optimization algorithm was applied to the waypoints without clustering. The processing time was approximately 7.5 hours, and the expected energy consumed by the vehicle traveling to the waypoints was also higher.

A computer includes a processor and a memory, and the memory stores instructions executable by the processor to divide a plurality of waypoints in a geographic area into a plurality of clusters according to at least one metric, arrange the clusters into an upper-level ordering by executing an optimization algorithm, arrange the waypoints within the respective clusters into a plurality of respective lower-level orderings by executing the optimization algorithm on the respective clusters, and output the waypoints in a final ordering by concatenating the waypoints in the lower-level orderings according to the upper-level ordering. The final ordering defines a final route passing through the waypoints in the final ordering.

In an example, the instructions may further include instructions to instruct a vehicle to navigate the final route.

In an example, the instructions may further include instructions to determine a plurality of intermediate routes between consecutive waypoints in the final ordering, the final route including the intermediate routes.

In an example, the at least one metric may include at least one of distance, geographical density, travel time, or energy consumption.

In an example, the instructions to execute the optimization algorithm may include instructions to minimize a cost associated with a route defined by an ordering outputted by the optimization algorithm. In a further example, the cost may include at least one of distance, travel time, or energy consumption.

In an example, the instructions may further include instructions to, before arranging the waypoints into the lower-level orderings, determine a plurality of start waypoints and end waypoints for the respective clusters, and the start waypoints and end waypoints may serve as constraints on the optimization algorithm when executed on the respective clusters. In a further example, the instructions to determine the start waypoints and end waypoints may include instructions to determine the start waypoints and end waypoints based on the upper-level ordering.

In another further example, the instructions to determine the start waypoints and end waypoints may include instructions to determine the start waypoints and end waypoints to minimize a pairwise cost between consecutive ones of the clusters in the upper-level ordering. In a still further example, the pairwise cost may include at least one of distance, travel time, or energy consumption.

In an example, the instructions may further include instructions to determine representative waypoints for the respective clusters, and the instructions to determine the upper-level ordering may include instructions to execute the optimization algorithm on the representative waypoints.

In an example, the instructions may further include instructions to divide the waypoints in a first cluster of the clusters into a plurality of further clusters, and arrange the further clusters in the first cluster into a mid-level ordering. In a further example, the instructions to arrange the clusters into the upper-level ordering may include instructions to insert the further clusters into a position of the first cluster in the upper-level ordering with the further clusters in the mid-level ordering.

In an example, the instructions may further include instructions to determine that a first cluster of the clusters satisfies a clustering condition, and upon determining that the first cluster satisfies the clustering condition, divide the waypoints in the first cluster into a plurality of further clusters. In a further example, the instructions may further include instructions to, upon dividing the waypoints in the first cluster into the further clusters, arrange the further clusters in the first cluster into a mid-level ordering. In a still further example, the instructions to arrange the clusters into the upper-level ordering may include instructions to insert the further clusters into a position of the first cluster in the upper-level ordering with the further clusters in the mid-level ordering.

In another further example, the instructions may further include instructions to iteratively divide the waypoints in the first cluster into further clusters until the clustering condition fails to be satisfied. In a still further example, the instructions to determine the upper-level ordering may include instructions to iteratively arrange the further clusters in one iteration within the respective further clusters in an immediately previous iteration into respective mid-level orderings. In a yet still further example, the instructions to determine the upper-level ordering may include instructions to iteratively insert the further clusters from one iteration into a position of the further cluster that includes the further clusters from the one iteration in an immediately previous iteration with the further clusters from the one iteration in the respective mid-level ordering.

A method includes dividing a plurality of waypoints in a geographic area into a plurality of clusters according to at least one metric, arranging the clusters into an upper-level ordering by executing an optimization algorithm, arranging the waypoints within the respective clusters into a plurality of respective lower-level orderings by executing the optimization algorithm on the respective clusters, and outputting the waypoints in a final ordering by concatenating the waypoints in the lower-level orderings according to the upper-level ordering. the final ordering defines a final route passing through the waypoints in the final ordering.

With reference to the Figures, wherein like numerals indicate like parts throughout the several views, a computer 100 includes a processor and a memory, and the memory stores instructions executable by the processor to divide a plurality of waypoints 205 in a geographic area into a plurality of clusters 210 according to at least one metric, arrange the clusters 210 into an upper-level ordering by executing an optimization algorithm, arrange the waypoints 205 within the respective clusters 210 into a plurality of respective lower-level orderings by executing the optimization algorithm on the respective clusters 210, and output the waypoints 205 in a final ordering by concatenating the waypoints 205 in the lower-level orderings according to the upper-level ordering. The final ordering defines a final route 410 passing through the waypoints in the final ordering.

With reference to FIG. 1, the computer 100 is a microprocessor-based computing device, e.g., a generic computing device including a processor and a memory. The memory of the computer 100 can include media for storing instructions executable by the processor as well as for electronically storing data and/or databases, and/or the computer 100 can include structures such as the foregoing by which programming is provided. The computer 100 can be multiple computers coupled together.

The computer 100 is connected to a network 105. The network 105 represents one or more mechanisms by which the computer 100 may communicate with a remote server. Accordingly, the network 105 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

One or more vehicles 110 may be connected to the computer 100 via the network 105. Each vehicle 110 may be any passenger or commercial automobile such as a car, a truck, a sport utility vehicle, a crossover, a van, a minivan, a taxi, a bus, etc.

One or more of the vehicles 110 may be autonomous vehicles. A vehicle computer on board a vehicle 110 can be programmed to operate that vehicle 110 independently of the intervention of a human operator, completely or to a lesser degree. The vehicle computer may be programmed to operate a propulsion system, a brake system, a steering system, and/or other vehicle systems. For the purposes of this disclosure, autonomous operation means the vehicle computer controls the propulsion system, brake system, and steering system without needing input from a human operator; semi-autonomous operation means the vehicle computer controls one or two of the propulsion system, brake system, and steering system and a human operator controls the remainder, or that the vehicle computer controls all three of the propulsion system, the brake system, and the steering system but the human operator must be prepared to take over control of the vehicle 110; and nonautonomous operation means a human operator controls the propulsion system, brake system, and steering system.

Each vehicle 110 may include a user interface 115. The user interface 115 presents information to and receives information from an occupant of the vehicle 110. The user interface 115 may be located, e.g., on an instrument panel in a passenger cabin of the vehicle 110, or wherever may be readily seen by the occupant. The user interface 115 may include dials, digital readouts, screens, speakers, and so on for providing information to the occupant, e.g., human-machine interface (HMI) elements such as are known. The user interface 115 may include buttons, knobs, keypads, microphone, and so on for receiving information from the occupant.

One or more mobile devices 120 associated with the vehicles 110 may be connected to the computer 100 via the network 105. Each mobile device 120 is a portable computing device such as a mobile phone, e.g., a smartphone, or a tablet. The mobile device 120 is a computing device including a processor and a memory. For example, the mobile device 120 may be owned and carried by a person who is the operator or owner of a respective one of the vehicles 110.

Figure 2:
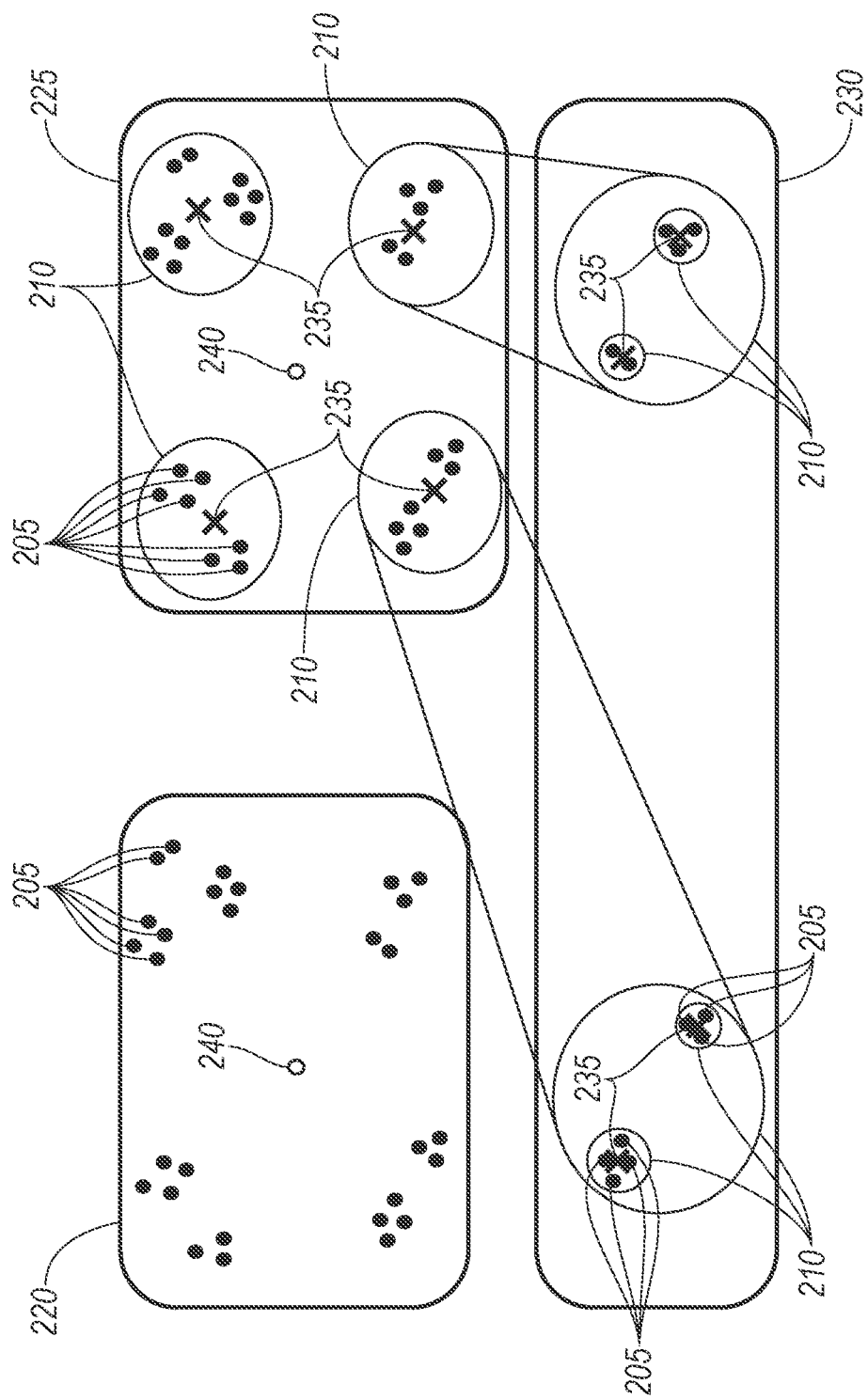
FIG. 2 is a diagram of waypoints for which to determine an ordering.

With reference to FIG. 2, the computer 100 is programmed to receive a plurality of the waypoints 205. (To increase legibility, only some of the waypoints 205 are marked in FIGS. 2 and 3.) The waypoints 205 are points within a geographic area. The waypoints 205 may be represented as geographic coordinates. The waypoints 205 may include one or two terminal waypoints 240, designated as first or final waypoints 205 of the final ordering.

The waypoints 205 are arrangeable into an ordering. For the purposes of this disclosure, an "ordering" is defined as a set of objects with a specified order or sequence of the objects relative to one another, i.e., one of the objects is first, another object is second, and so on. For example, an ordering may be an order or sequence in which the waypoints 205 are visited along a route.

The computer 100 is programmed to divide the waypoints 205 into the clusters 210. For the purposes of this disclosure, a "cluster" is defined as an unordered set of objects. The waypoints 205 may be sorted into the clusters 210 based on one or more characteristics of the waypoints 205, e.g., the closest together waypoints 205 along one or more dimensions. The terminal waypoints 240 may be left out of the clusters 210.

The computer 100 may be programmed to divide the waypoints 205 into the clusters 210 by executing a clustering algorithm. The computer 100 may use any suitable clustering algorithm for the waypoints 205, e.g., k-means clustering, mini-batch k-means, density-based spatial clustering of applications with noise (DBSCAN), Gaussian mixture model, balance iterative reducing and clustering using hierarchies (BIRCH), affinity propagation clustering, mean-shift clustering, ordering points to identify the clustering structure (OPTICS), agglomerative hierarchy clustering, divisive hierarchical clustering, spectral clustering, etc. The clustering algorithm may be one for which a final number of clusters 210 is unspecified before executing the clustering algorithm (though an initial estimate of the number of clusters 210 may be a parameter of the clustering algorithm), e.g., affinity propagation, BIRCH, DBSCAN, mean shift, or OPTICS.

The computer 100 is programmed to divide the waypoints 205 into the clusters 210 according to at least one metric. For example, the metric may include at least one of distance, geographical density, travel time, or energy consumption. The computer 100 may determine values for a parameter of the clustering algorithm based on the metric. For example, a parameter of affinity propagation is similarity between pairs of the waypoints 205, and the similarity may be determined as one or a combination of a distances between a pair of the waypoints 205 (either Euclidean distance or distance as traveled), a travel time between the pair of waypoints 205, or an energy consumed traveling between the pair of waypoints 205. For another example, a parameter of BIRCH is density of the waypoints 205, and the density may be determined as the geographical density, i.e., the number of waypoints 205 per unit area.

The computer 100 may be programmed to divide the waypoints 205 in one of the clusters 210 into a plurality of further clusters 210, e.g., according to the same metric. In the example illustrated in FIG. 2, the computer 100 receives the waypoints 205 in a "zeroth" iteration 220, divides the waypoints 205 into four clusters 210 in a first iteration 225, and divides the waypoints 205 in two of those clusters 210 into two further clusters 210 for each of the two clusters 210 in a second iteration 230. The computer 100 may iteratively divide the waypoints 205 in at least one of the clusters 210 into further clusters 210, e.g., for a preset number of iterations or until a clustering condition fails to be satisfied, as described below. The preset number of iterations may be chosen based on a typical amount of clustering of a type of the waypoints 205, e.g., a typical amount of clustering of waypoints on a delivery route. At each iteration, the computer 100 may divide the waypoints 205 in (some or all of) the clusters 210 from the immediately previous iteration into the further clusters 210, e.g., the waypoints 205 in the clusters 210 in the first iteration 225 into further clusters 210 in the second iteration 230, the waypoints 205 in the (further) clusters 210 in the second iteration 230 into further clusters 210 in a third iteration, etc. (The term "cluster" is used herein refer to clusters 210 at any iteration, and the term "further cluster" is used herein to refer to the clusters 210 in a next iteration.)

The computer 100 may be programmed to determine whether a cluster 210 satisfies a clustering condition. The clustering condition may be implemented as part of the clustering algorithm. For example, the clustering condition may be satisfied depending on whether the clustering algorithm divides the waypoints 205 into multiple clusters 210. For another example, the clustering condition may include a threshold for the metric of the clustering algorithm, e.g., a minimum threshold for a change in the metric from one iteration to a next iteration. The change in the metric may be, e.g., an increase in density within the clusters 210 from one iteration to the next iteration or a decrease in a mean pairwise distance between the waypoints 205 within the clusters 210 from one iteration to the next iteration. The minimum threshold may be chosen to indicate a nonspurious increase or decrease. The computer 100 may iteratively divide the waypoints 205 in the clusters 210 satisfying the clustering condition until the clustering condition fails to be satisfied, e.g., none of the clusters 210 in an iteration satisfy the clustering condition.

The computer 100 may be programmed to determine representative waypoints 235 for the respective clusters 210. The representative waypoint 235 can serve as a stand-in for the cluster 210, e.g., for the optimization algorithm, which operates on waypoints 205 as described below. For example, the representative waypoint 235 may be a centroid of the cluster 210. The computer 100 may determine the centroid by, for each dimension, determining a mean of the values for that dimension of the waypoints 205. For example, the dimensions may be latitude and longitude, and the centroid may be represented as a geographical coordinate with a latitude equal to a mean of the latitudes of the waypoints 205 and a longitude equal to a mean of the longitudes of the waypoints 205. For another example, the computer 100 may select one of the waypoints 205 of each cluster 210 as an exemplar of that cluster 210, e.g., when using affinity propagation as the clustering algorithm.

Figure 3:
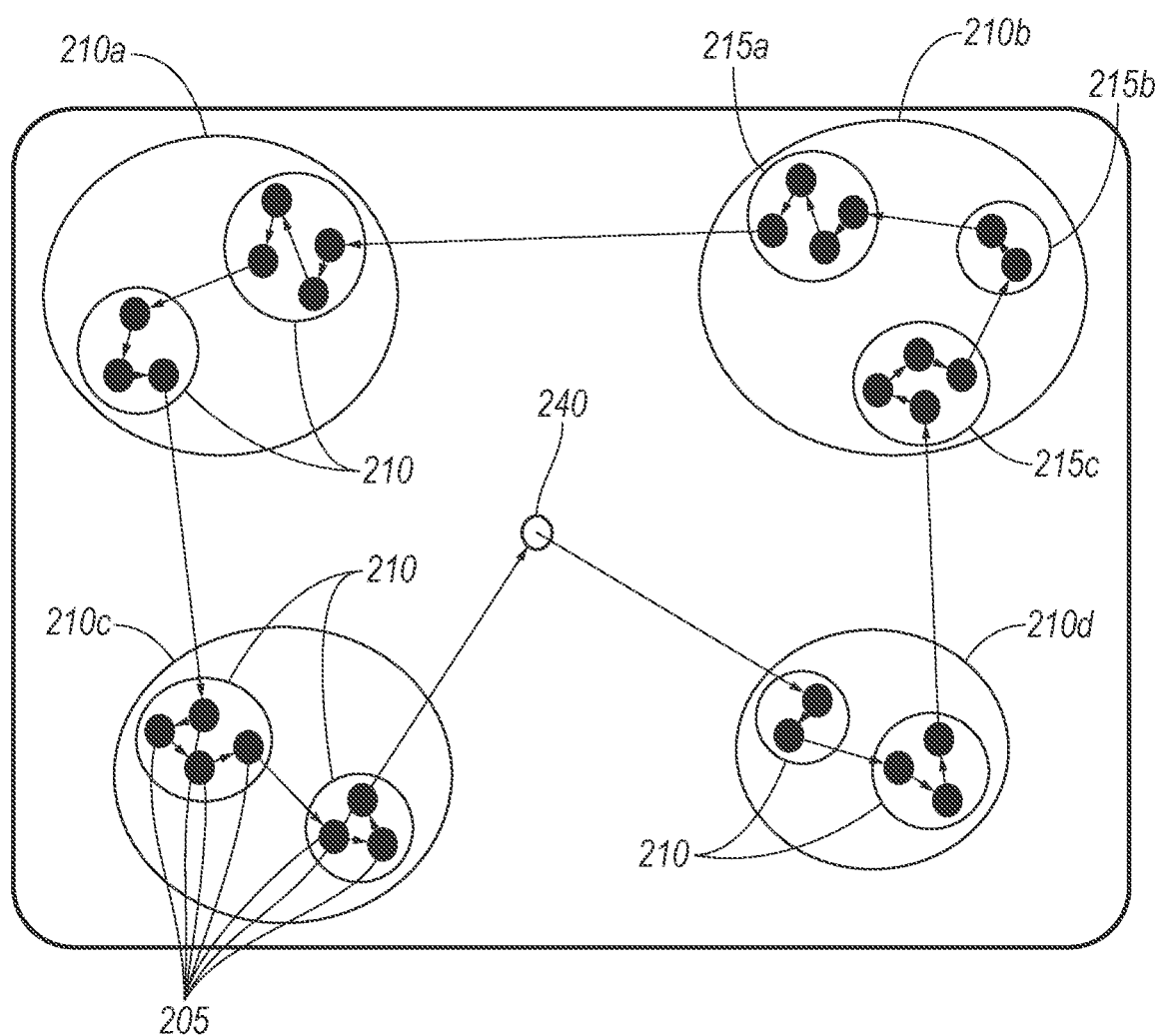
FIG. 3 is a diagram of the waypoints connected in the ordering.

With reference to FIG. 3, the computer 100 may be programmed to determine a cost associated with an ordering of the clusters 210 or waypoints 205. The cost may be associated with a lower-level ordering of the waypoints 205 within one of the clusters 210, an upper-level ordering of the clusters 210 in the first iteration 225, or a mid-level ordering of the clusters 210 (and possibly unclustered waypoints 205) within a cluster 210. The clusters 210 may be represented by the respective representative waypoints 235 when determining the cost. The cost may be defined as a function of the ordering, e.g., a value of a cost function taking the ordering as an argument. For example, the cost function may be a sum of transition costs between consecutive clusters 210 or waypoints 205, e.g., as given in the following equation:

$$C = \sum_{i=1}^{N-1} c_{i,i+1}$$

in which C is the cost of the ordering, i is an index of placement in the ordering, N is the number of waypoints 205 or clusters 210 in the ordering, and $c_{i,i+1}$ is the transition cost from the ith waypoint 205 or cluster 210 to the next waypoint 205 or cluster 210 in the ordering. The cost may include at least one of distance, travel time, or energy consumption. For example, the transition costs may be the distance, travel time, or energy consumption to travel from one waypoint 205 or cluster 210 to a next waypoint 205 or cluster 210 in the ordering (with the clusters 210 represented by the representative waypoints 235).

The computer 100 is programmed to execute an optimization algorithm to arrange the waypoints 205 or clusters 210 within a cluster 210 into an ordering or to arrange the clusters 210 in the first iteration 225 into an ordering. The clusters 210 may be represented by the representative waypoints 235 when executing the optimization algorithm, i.e., the optimization algorithm may be executed on the representative waypoints 235. The optimization algorithm may be any algorithm suitable for combinatorial optimization, e.g., Steiner trees, Eulerian cycles, linear programming, max flow, fastest path such as Dijkstra's algorithm, push-relabel algorithm, edge-contraction algorithm, etc. The optimization algorithm may determine the ordering, i.e., arrange the waypoints 205 or clusters 210 into the ordering, by minimizing the cost associated with the ordering, i.e., outputting the ordering for which the optimization algorithm found a minimum cost.

The computer 100 is programmed to arrange the clusters 210 into an upper-level ordering, e.g., by executing the optimization algorithm on the clusters 210, e.g., on the clusters 210 in the first iteration 225. The upper-level ordering is an ordering of the clusters 210 in the first iteration 225. In the example illustrated in FIG. 3, the upper-level ordering may be {fourth cluster 210d, second cluster 210b, first cluster 210a, third cluster 210c}.

The computer 100 may be programmed to arrange the further clusters 210 in each cluster 210 into a mid-level ordering, e.g., by executing the optimization algorithm on the further clusters 210 within that cluster 210, e.g., on the further clusters 210 in the second iteration 230 within each cluster 210 of the first iteration 225. Each mid-level ordering is an ordering within a cluster 210 from one iteration of the further clusters 210 in that cluster 210 in a next iteration; i.e., each mid-level ordering is an ordering of the further clusters 210 in iteration j+1 that are in a cluster 210 in iteration j. In the example illustrated in FIG. 3, the mid-level ordering of the further clusters 215a-c in the second cluster 210b may be {third further cluster 215c, second further cluster 215b, first further cluster 215a}. The computer 100 may iteratively arrange the further clusters 210 in one iteration within the respective clusters 210 in an immediately previous iteration into respective mid-level orderings. The computer 100 may iteratively arrange the further clusters 210 until reaching an iteration for which the clusters 210 do not contain further clusters 210, only waypoints 205, e.g., the iteration at which the clustering condition was not satisfied as described above.

The computer 100 is programmed to arrange the waypoints 205 within the clusters 210, e.g., within each cluster 210 that does not contain further clusters 210, into respective lower-level orderings, e.g., by executing the optimization algorithm on the waypoints 205 within each cluster 210 that does not contain further clusters 210. A lower-level ordering is an ordering of the waypoints 205 within a cluster 210.

The computer 100 may be programmed to, before arranging the waypoints 205 or further clusters 210 in a cluster 210 into an ordering, determine a start waypoint 205 or start further cluster 210 and an end waypoint 205 or end further cluster 210. The start waypoint 205 or start further cluster 210 may serve as a first waypoint 205 or cluster 210 in the ordering, and the end waypoint 205 or end further cluster 210 may serve as a final waypoint 205 or cluster 210 in the ordering. The computer 100 may determine the start waypoint 205 or start further cluster 210 and the end waypoint 205 or end further cluster 210 within a cluster 210 based on an ordering containing the cluster 210, e.g., in the example of FIG. 3, the start waypoint 205 and end waypoint 205 in the third further cluster 215c may be based on the mid-level ordering of the further clusters 215a-c within the second cluster 210b, and the start further cluster 210 and end further cluster 210 in the second cluster 210b may be based on the upper-level ordering of the clusters 210. For example, the computer 100 may determine the start waypoint 205 or start further cluster 210 and the end waypoint 205 or end further cluster 210 within a cluster 210 to minimize a pairwise cost between consecutive clusters 210 in the ordering containing the cluster 210, e.g., in the example of FIG. 3, to determine the end waypoint 205 in the third further cluster 215c by minimizing the pairwise cost from the third further cluster 215c to the second further cluster 215b in the mid-level ordering within the second cluster 210b, and to determine the start further cluster 215 and end further cluster 215 in the second cluster 210b by minimizing the pairwise costs between the fourth cluster 210d and the second cluster 210b and between the second cluster 210b and the first cluster 210a in the upper-level ordering. The pairwise cost may be, e.g., the transition cost as described above. The pairwise cost may include at least one of distance, travel time, or energy consumption.

Once determined, the start waypoints 205 or start further clusters 210 and the end waypoints 205 or end further clusters 210 may serve as constraints on the optimization algorithm when executed on the clusters 210 containing the start waypoints 205 or start further clusters 210 and the end waypoints 205 or end further clusters 210. In the example of FIG. 3, the start waypoint 205 and end waypoint 205 in the third further cluster 215c may serve as a constraint on the optimization algorithm when executed to arrange the waypoints 205 in the third further cluster 215c, and the start further cluster 210 and end further cluster 210 in the second cluster 210b may serve as a constraint on the optimization algorithm when executed to arrange the further clusters 215 in the second cluster 210b. The terminal waypoints 240 may similarly serve as a constraint on the optimization algorithm when determining the upper-level ordering. For the purposes of this disclosure, "serving as a constraint" is defined as restricting potential solutions to solutions satisfying the constraint.

The computer 100 may be programmed to insert the further clusters 210 or waypoints 205 in a cluster 210 into a position of that cluster 210 in an ordering containing that cluster 210, with the further clusters 210 or waypoints 205 in the ordering of that cluster 210. In the example of FIG. 3, the second cluster 210b includes the mid-level ordering {third further cluster 215c, second further cluster 215b, first further cluster 215a}, and the waypoints 205 in each further cluster 215 in the respective lower-level ordering can be inserted into the position of the respective further cluster 210 in the mid-level ordering, resulting in {{waypoints 205 of third further cluster 215c in lower-level ordering}, {waypoints 205 of second further cluster 215b in lower-level ordering}, {waypoints 205 of first further cluster 215a in lower-level ordering} }. In other words, the waypoints 205 of the further clusters 215 in the lower-level orderings are concatenated in the mid-level ordering of the further clusters 215. Further in the example of FIG. 3, the upper-level ordering is {fourth cluster 210d, second cluster 210b, first cluster 210a, third cluster 210c}, and the further clusters 215 in the second cluster 210b in the mid-level ordering can be inserted into the position of the second cluster 210b in the upper-level ordering, resulting in {fourth cluster 210d, {third further cluster 215c, second further cluster 215b, first further cluster 215a}, first cluster 210a, third cluster 210c}. The same can be done with the other clusters 210 in the upper-level ordering. The computer 100 may iteratively insert the waypoints 205 or further clusters 210 from one iteration into a position of the cluster 210 that includes the waypoints 205 or further clusters 210 from that iteration in an immediately previous iteration with the waypoints 205 or further clusters 210 in the respective ordering. Iteratively combining the examples from FIG. 3 just described results in {fourth cluster 210d, {{waypoints 205 of third further cluster 215c in lower-level ordering}, {waypoints 205 of second further cluster 215b in lower-level ordering}, {waypoints 205 of first further cluster 215a in lower-level ordering}}, first cluster 210a, third cluster 210c}.

The computer 100 is programmed to output the waypoints 205 in a final ordering by concatenating the waypoints 205 in the lower-level orderings according to the mid-level orderings and upper-level ordering, e.g., the lower-level orderings arranged in the mid-level orderings of the next iteration, those mid-level orderings arranged in the mid-level orderings of the next iteration, and so on to the upper-level ordering. In the example of FIG. 3, the waypoints 205 in the lower-level orderings are concatenated in the order of the mid-level orderings of the further clusters 210 within the clusters 210, with those mid-level orderings following the upper-level ordering of the clusters 210.

Figure 4:
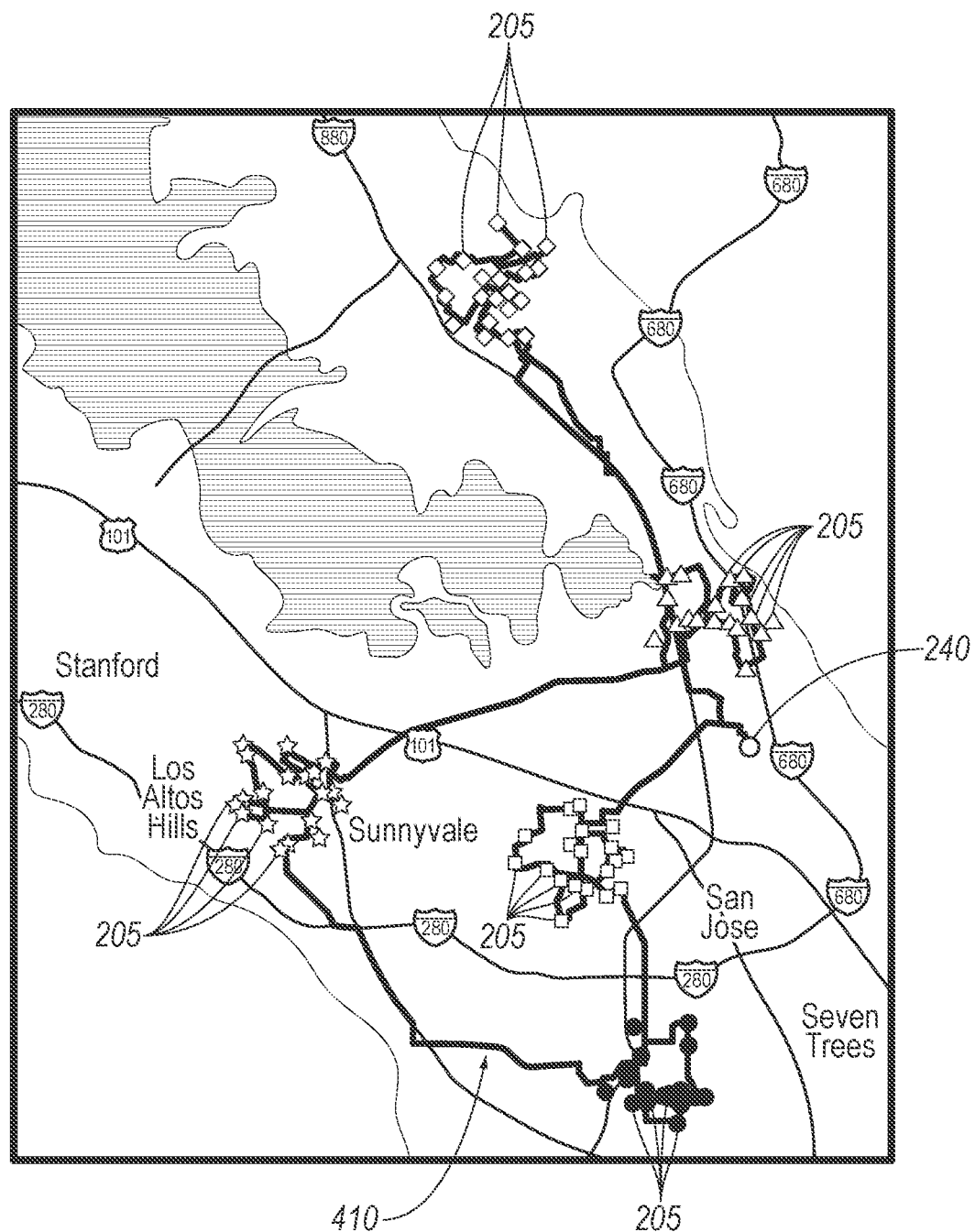
FIG. 4 is a map of waypoints connected in an ordering.

FIG. 4 shows the waypoints 205 in a geographic area. (To increase legibility, only some of the waypoints 205 are marked in FIG. 4.) The final ordering defines a final route 410 passing through the waypoints 205 in the final ordering. The computer 100 may be programmed to determine the final route 410 from the final ordering. The computer 100 may determine intermediate routes between each pair of consecutive waypoints 205. The intermediate routes may be turn-by-turn instructions from one waypoint 205 to the next waypoint 205. For example, the computer 100 may determine the intermediate routes using a mapping algorithm, as is known.

The computer 100 may be programmed to instruct one of the vehicles 110 to navigate the final route 410. For example, the computer 100 may transmit the final ordering of the waypoints 205 to the vehicle 110 via the network 105. The computer 100 may transmit the final route 410 along with the final ordering, or a vehicle computer of the vehicle 110 may determine the final route 410 from the final ordering by determining the intermediate routes between each pair of consecutive waypoints 205. The vehicle computer may autonomously or semi-autonomously navigate the vehicle 110 along the final route 410. Alternatively or additionally, the vehicle computer may instruct the user interface 115 of the vehicle 110 to display the final route 410 to an operator of the vehicle 110 so that the operator can navigate the vehicle 110 along the final route 410. For another example, the computer 100 may transmit the final ordering of the waypoints 205 to the mobile device 120 associated with the vehicle 110 via the network 105. The computer 100 may also transmit the final route 410, or the mobile device 120 may determine the final route 410 as described. The mobile device 120 may display the final route 410 to the operator of the vehicle 110 so that the operator can navigate the vehicle 110 along the final route 410.

Figure 5:
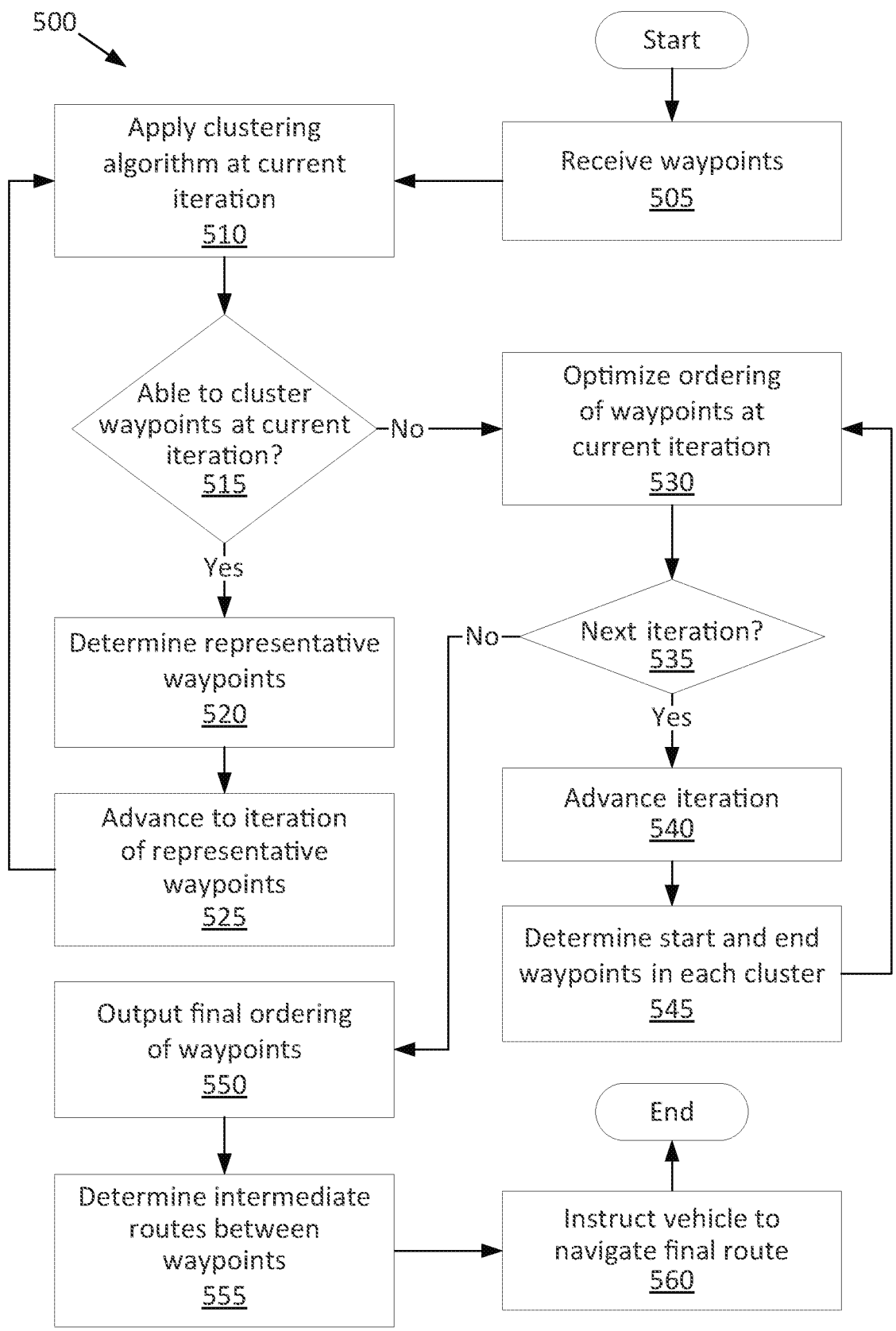
FIG. 5 is a flowchart of an example process for arranging the waypoints in the ordering.

FIG. 5 is a process flow diagram illustrating an example process 500 for determining the final ordering of the waypoints 205. The memory of the computer 100 stores executable instructions for performing the steps of the process 500 and/or programming can be implemented in structures such as mentioned above. As a general overview of the process 500, the computer 100 receives the waypoints 205. The computer 100 iteratively divides the waypoints 205 or representative waypoints 235 into clusters 210 and determines the representative waypoints 235 for the clusters 210 until the clustering condition is not satisfied. The computer 100 iteratively arranges the waypoints 205 or representative waypoints 235 within each cluster 210 in a current iteration and determines the start waypoint 205 and end waypoint 205 of the immediately previous iteration until reaching the iteration with only waypoints 205 and no further clusters 210. Finally, the computer 100 outputs the waypoints 205 in the final ordering.

The process 500 begins in a block 505, in which the computer 100 receives the waypoints 205, including the terminal waypoints 240.

Next, in a block 510, the computer 100 divides the waypoints 205 or representative waypoints 235 at a current iteration into clusters 210, starting at the zeroth iteration 220, as described above.

Next, in a decision block 515, determines whether any of the clusters 210 at the current iteration, i.e., the clusters 210 created in the block 510 in the current iteration, satisfy the clustering condition, as described above. Upon determining that at least one of the clusters 210 at the current iteration satisfy the clustering condition, the process 500 proceeds to a block 520. Upon determining that none of the clusters 210 at the current iteration satisfy the clustering condition, the process 500 proceeds to a block 530.

In the block 520, the computer 100 determines representative waypoints 235 for the clusters 210 at the current iteration, as described above.

Next, in a block 525, the computer 100 advances to a next iteration. After the block 525, the process 500 returns to the block 510, in which the computer 100 will act on the representative waypoints 235 created in the block 520 in what is now the immediately previous iteration.

In the block 530, the computer 100 arranges the waypoints 205 or representative waypoints 235 at a current iteration into orderings, either the waypoints 205 or representative waypoints 235 within the clusters 210 at the current iteration or the representative waypoints 235 of the clusters 210 at the first iteration 225, by executing the optimization algorithm, as described above. The first execution of the block 530 starts with the first iteration.

Next, in a decision block 535, the computer 100 determines whether there is a next iteration for which to arrange the waypoints 205 or representative waypoints 235, i.e., whether the current iteration is the final iteration advanced to in the block 525, i.e., whether the next iteration includes clusters 210. If there is a next iteration, the process 500 proceeds to a block 540. If there is not a next iteration, the process 500 proceeds to a block 550.

In the block 540, the computer 100 advances the current iteration to a next iteration.

Next, in a block 545, the computer 100 determines the start waypoints 205 and end waypoints 205 of the clusters 210 at the current iteration, as described above. After the block 545, the process 500 returns to the block 530 to arrange the waypoints 205, constrained by the start waypoints 205 and end waypoints 205, as described above.

In the block 550, the computer 100 outputs the waypoints 205 in the final ordering, as described above.

Next, in a block 555, the computer 100 determines the intermediate routes between the consecutive waypoints 205 to form the final route 410, as described above.

Next, in a block 560, the computer 100 instructs one of the vehicles 110 to navigate the final route 410, as described above. After the block 560, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. The adjectives "first," "second," "third," and "fourth" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   divide a plurality of waypoints in a geographic area into a plurality of clusters according to at least one metric;
   arrange the clusters into an upper-level ordering by executing an optimization algorithm;
   divide the waypoints in a first cluster of the clusters into a plurality of further clusters;
   arrange the further clusters in the first cluster into a mid-level ordering;
   arrange the waypoints within the respective clusters into a plurality of respective lower-level orderings by executing the optimization algorithm on the respective clusters;
   output the waypoints in a final ordering by concatenating the waypoints in the lower-level orderings according to the upper-level ordering, the final ordering defining a final route passing through the waypoints in the final ordering; and
   instruct a vehicle to navigate the final route.

2. The computer of claim 1, wherein the instructions further include instructions to determine a plurality of intermediate routes between consecutive waypoints in the final ordering, the final route including the intermediate routes.

3. The computer of claim 1, wherein the at least one metric includes at least one of distance, geographical density, travel time, or energy consumption.

4. The computer of claim 1, wherein the instructions to execute the optimization algorithm include instructions to minimize a cost associated with a route defined by an ordering outputted by the optimization algorithm.

5. The computer of claim 4, wherein the cost includes at least one of distance, travel time, or energy consumption.

6. The computer of claim 1, wherein the instructions further include instructions to, before arranging the waypoints into the lower-level orderings, determine a plurality of start waypoints and end waypoints for the respective clusters; and the start waypoints and end waypoints serve as constraints on the optimization algorithm when executed on the respective clusters.

7. The computer of claim 6, wherein the instructions to determine the start waypoints and end waypoints include instructions to determine the start waypoints and end waypoints based on the upper-level ordering.

8. The computer of claim 6, wherein the instructions to determine the start waypoints and end waypoints include instructions to determine the start waypoints and end waypoints to minimize a pairwise cost between consecutive ones of the clusters in the upper-level ordering.

9. The computer of claim 8, wherein the pairwise cost includes at least one of distance, travel time, or energy consumption.

10. The computer of claim 1, wherein the instructions further include instructions to determine representative waypoints for the respective clusters, and the instructions to determine the upper-level ordering include instructions to execute the optimization algorithm on the representative waypoints.

11. The computer of claim 1, wherein the instructions to arrange the clusters into the upper-level ordering include instructions to insert the further clusters into a position of the first cluster in the upper-level ordering with the further clusters in the mid-level ordering.

12. The computer of claim 1, wherein the instructions further include instructions to determine that the first cluster of the clusters satisfies a clustering condition, and upon determining that the first cluster satisfies the clustering condition, divide the waypoints in the first cluster into the plurality of the further clusters.

13. The computer of claim 12, wherein the instructions to arrange the clusters into the upper-level ordering include instructions to insert the further clusters into a position of the first cluster in the upper-level ordering with the further clusters in the mid- level ordering.

14. The computer of claim 12, wherein the instructions further include instructions to iteratively divide the waypoints in the first cluster into the further clusters until the clustering condition fails to be satisfied.

15. The computer of claim 14, wherein the instructions to determine the upper-level ordering include instructions to iteratively arrange the further clusters in one iteration within the respective further clusters in an immediately previous iteration into respective mid-level orderings.

16. The computer of claim 15, wherein the instructions to determine the upper-level ordering include instructions to iteratively insert the further clusters from one iteration into a position of the further cluster that includes the further clusters from the one iteration in an immediately previous iteration with the further clusters from the one iteration in the respective mid-level ordering.

17. A method comprising:
dividing a plurality of waypoints in a geographic area into a plurality of clusters according to at least one metric;
arranging the clusters into an upper-level ordering by executing an optimization algorithm;
dividing the waypoints in a first cluster of the clusters into a plurality of further clusters;
arranging the further clusters in the first cluster into a mid-level ordering;
arranging the waypoints within the respective clusters into a plurality of respective lower-level orderings by executing the optimization algorithm on the respective clusters; and
outputting the waypoints in a final ordering by concatenating the waypoints in the lower-level orderings according to the upper-level ordering, the final ordering defining a final route passing through the waypoints in the final ordering; and
instructing a vehicle to navigate the final route.

18. A computer comprising a processor and a memory, the memory storing instructions executable by the processor to:
divide a plurality of waypoints in a geographic area into a plurality of clusters according to at least one metric;
arrange the clusters into an upper-level ordering by executing an optimization algorithm;
determine that a first cluster of the clusters satisfies a clustering condition;
upon determining that the first cluster satisfies the clustering condition, divide the waypoints in the first cluster into a plurality of further clusters;
arrange the waypoints within the respective clusters into a plurality of respective lower-level orderings by executing the optimization algorithm on the respective clusters;
output the waypoints in a final ordering by concatenating the waypoints in the lower-level orderings according to the upper-level ordering, the final ordering defining a final route passing through the waypoints in the final ordering; and
instruct a vehicle to navigate the final route.

19. The computer of claim 18, wherein the instructions further include instructions to, upon dividing the waypoints in the first cluster into the further clusters, arrange the further clusters in the first cluster into a mid-level ordering.

20. The computer of claim 19, wherein the instructions to arrange the clusters into the upper-level ordering include instructions to insert the further clusters into a position of the first cluster in the upper-level ordering with the further clusters in the mid-level ordering.

21. The computer of claim 18, wherein the instructions further include instructions to iteratively divide the waypoints in the first cluster into further clusters until the clustering condition fails to be satisfied.

\* \* \* \* \*